Nov. 26, 1963 A. O. TROSTEL, JR., ETAL 3,111,795
APPARATUS FOR AND METHOD OF BUNDLING HIDES
AND SKINS, OR PARTS THEREOF
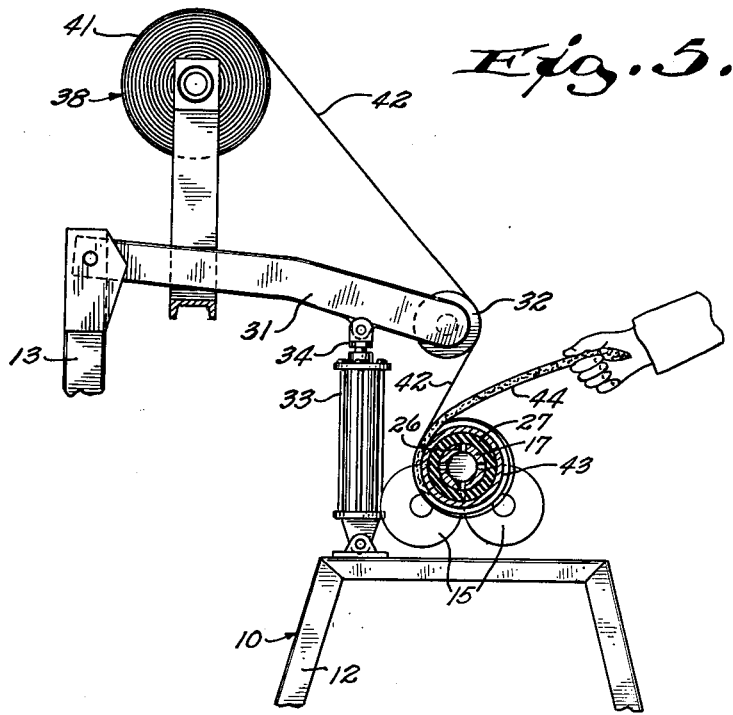
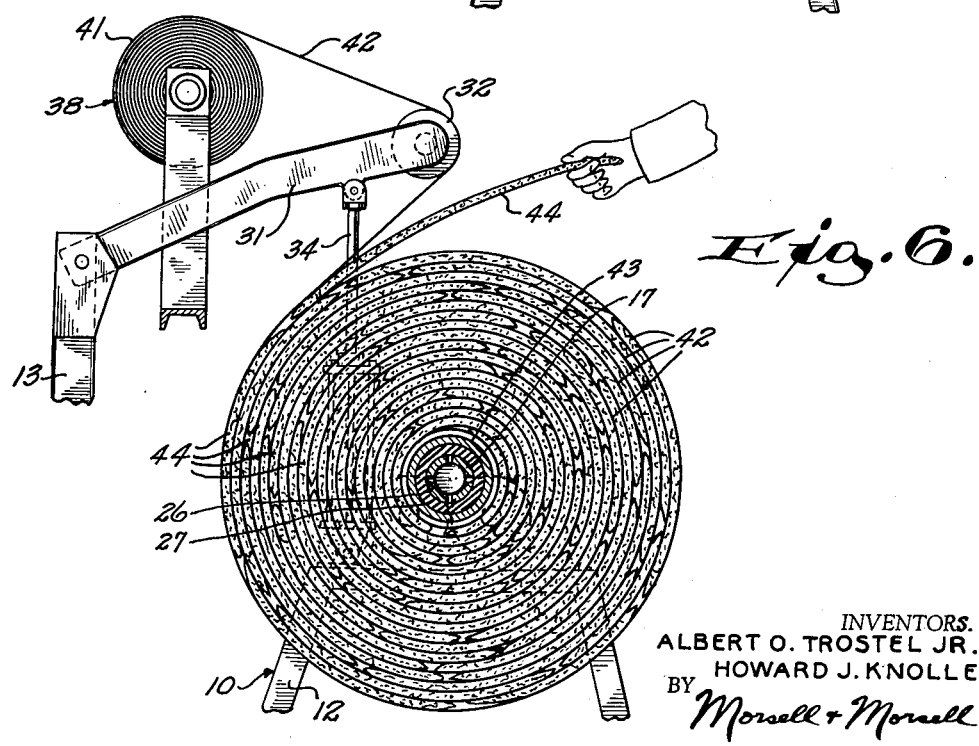
INVENTORS.
ALBERT O. TROSTEL JR.
HOWARD J. KNOLLER
BY Morsell + Morsell
ATTORNEYS.

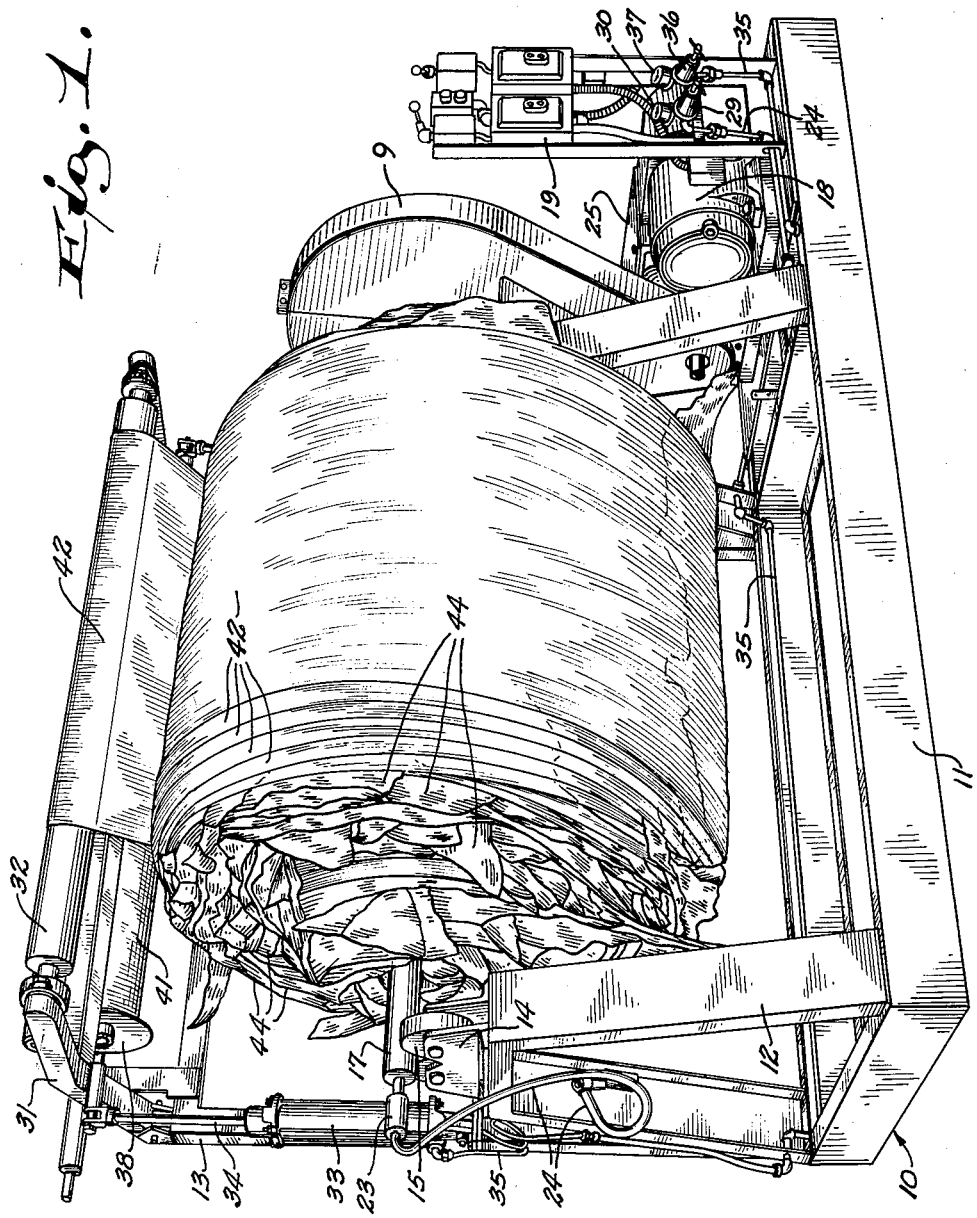

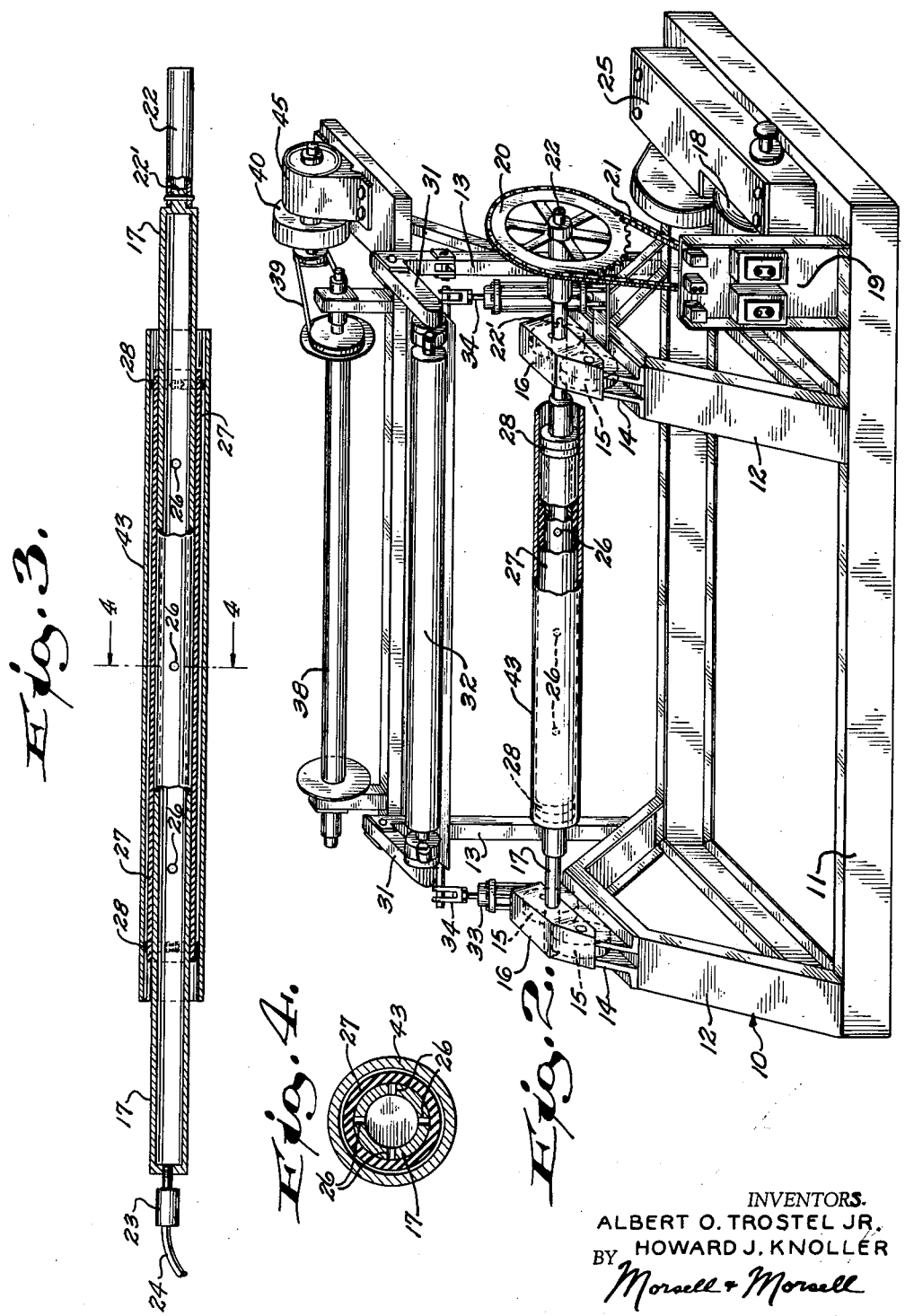

__United States Patent Office__

3,111,795
Patented Nov. 26, 1963

3,111,795
APPARATUS FOR AND METHOD OF BUNDLING
HIDES AND SKINS, OR PARTS THEREOF
Albert O. Trostel, Jr., and Howard J. Knoller, both of Milwaukee, Wis., assignors to Albert Trostel & Sons Co., Milwaukee, Wis., a corporation of Wisconsin
Filed Aug. 16, 1961, Ser. No. 131,863
4 Claims. (Cl. 53—32)

This invention relates to an improved apparatus for and method of bundling hides and skins or parts thereof, and more particularly to a machine for forming a large number of hides into a compact cylindrical roll for convenient shipping or storage.

Heretofore, when it has been desired to store a number of hides, or to transport the same from a tannery, the hides have ordinarily been manually arranged and tied in a cylindrical roll, which makes a more compact and more easily handled load than if they were merely arranged in stacked form. Unfortunately, however, it has heretofore been impossible to include more than ten or twelve hides in a single roll because unless the size of the roll was kept small enough for a hide to extend completely around the same there was no known way of holding the hides on the roll during the bundling operation. Thus, it has been the practice in the past to bundle hides in relatively small rolls, which ordinarily necessitates the wrapping, tieing, and transporting of a large number of rolls and which is time-consuming and inefficient. With this in mind, the principal objects of the present invention are to provide a machine which is adapted not only to mechanically wrap a plurality of hides and/or skins, or parts thereof, into a roll, thereby facilitating that task, but which machine makes it practical to include a much greater number of hides in a single roll than was formerly possible, thus reducing the number of rolls which must be individually tied and transported.

A more specific object of the present invention is to provide a machine for forming a plurality of loose hides into a cylindrical roll as described, which machine winds a continuous film of plastic material integrally with the rolled hides, thus providing means for containing the individual hides on the roll during the reeling operation, and permitting the inclusion in a single roll of a substantially greater number of hides than was formerly possible.

A further object of the invention is to provide a machine utilizing plastic film to maintain the hides on the roll as described, and, in addition, which plastic film provides a protective sheet between the layers of hides, which is important when shipping or storing finished or semi-finished hides.

A further object is to provide a hide bundling machine utilizing plastic film to facilitate the reeling operation, as described, which film also prevents the hides from sticking together, and facilitates their ultimate removal from the roll.

A further object of the invention is to provide a machine as described, which includes novel, integral means ensuring the rotation of the hide roll with the machine spindle during the reeling operation but which permits said hides to be quickly and easily removed from the spindle when the roll is completed.

A further object is to provide a novel machine for bundling a plurality of loose hides or the like into a compact, cylindrical roll, as described, which machine can also be utilized for unwinding the roll and removing the hides individually when they are to be used.

Still further objects of the present invention are to provide a machine for rolling and bundling hides which is relatively inexpensive in design and construction, which is durable, which is reliable in operation, and which machine is otherwise well adapted for its intended purposes.

With the above and other objects in view, the invention consists of the improved apparatus for and method of bundling hides and skins, or parts thereof, and all of its parts, combinations, and steps as set forth in the following specification and claims, and all equivalents thereof.

In the accompanying drawings, illustrating the preferred form of the invention, and wherein like reference numerals designate the same parts in all of the views:

FIG. 1 is a perspective view of the machine comprising the present invention with a roll of hides formed thereon;

FIG. 2 is a perspective view of the machine without any hides thereon, and with a portion of the machine spindle broken away and shown in section;

FIG. 3 is an elevational view, partly in section, showing the rotatable spindle assemblage employed in the invention;

FIG. 4 is a transverse sectional view through the spindle assemblage, taken along line 4—4 of FIG. 3;

FIG. 5 is a simplified diagrammatic view showing the position and function of the plastic film at the commencement of the reeling operation; and FIG. 6 is another diagrammatic view during the operation of the machine, and showing a roll of hides formed thereon.

Referring now more particularly to the drawings, it will be seen that the present machine includes a frame 10 having a base 11, an inverted, generally V-shaped support member 12 at each end, and a pair of spaced, vertical back members 13. Mounted on the upper end of each of said end supports 12 is a bracket 14 supporting a pair of rollers 15, and rotatably carried by and spanning said rollers, and projecting a short distance therebeyond, is a hollow spindle 17. An electric motor 18 or other prime mover is mounted at one end of the frame 10 (FIGS. 1 and 2), there being a control panel 19 therefor, and trained about the motor drive shaft and about an enlarged sprocket 20 thereabove is an endless drive chain 21 (FIG. 2). The sprocket shaft 22 is detachably drivingly coupled to one end of the spindle 17, as at 22', and is adapted to rotatably drive the same through its connection with said electric motor.

In the preferred form of the invention a removable hood 16 (FIG. 2) is mounted over the rollers 15 and a housing 9 covers the drive chain and sprocket assemblage (FIG. 1), to protect the operator, but it is to be understood that these elements are not critical features of the invention. It is to be understood, too, that while a chain and sprocket drive assemblage is illustrated, a V belt or any other suitable drive arrangement could be employed, and the invention is not to be limited in this respect.

As is best shown in FIGS. 1 and 3, the opposite end of the rotatable, hollow spindle 17 is detachably connected by a rotatable coupling 23 to an air hose 24 which leads from a source of compressed air, which can be located in the housing 25 adjacent the motor or at any other convenient location, thus permitting the introduction of compressed air into said spindle. As illustrated in FIGS. 3 and 4, the intermediate portion of the spindle is provided with a plurality of apertures 26, and a tube 27 formed of Vulkallon or similar rubber-like material surrounds said spindle and has its end portions sealingly engaged thereagainst by means of circular clamps 28. Thus, as will be hereinafter described in greater detail, it is possible to inflate and expand said tube 27 by introducing compressed air into the spindle through the hose 24, said air passing outwardly through the spindle apertures 26 to inflate said tube. By means of a valve 29 on the control panel (FIG. 1), and as indicated by a gauge 30, the operator can control the introduction and release of the compressed air in the spindle, and adjust the volume and rate thereof.

With reference again to FIGS. 1 and 2, it will be seen that pivotally connected to and projecting forwardly from the upper ends of the frame back members 13 are a pair of arms 31. Said arms are swingable in a vertical plane, and rotatably carried by and between the outer or forward ends thereof is a rod 32 hereinafter referred to as the "film guide" rod. A pneumatic cylinder 33 and piston 34 is mounted at each end of the frame and is engaged with an intermediate portion of the adjacent arm 31 to provide means for raising and lowering said arms about their pivot connections, there being an air hose 35 (FIG. 1) connecting said pneumatic cylinders to the compressed air source, and there being a suitable valve 36 and gauge 37 on the control panel (or at any other convenient location) to control the actuation of said pneumatic lifting members.

Mounted on the upper rear portion of the frame is a spool 38, hereinafter called the "film spool," and carried by the frame adjacent one end of said spool, and operatively connected thereto by an endless belt 39, is a magnetic slip clutch 40 (FIG. 2).

In the operation of the novel machine comprising the present invention, a supply roll 41 of plastic film 42 (FIGS. 5 and 6), such as vinyl or the like, is mounted on the aforementioned film spool 38. The end of the spindle 17 is then raised from its seat on the rollers 15 and a hollow fiber cylinder 43 (FIGS. 3 and 4) is slidably mounted on and in surrounding relation to the inflatable tube 27 on said spindle, said fiber cylinder forming the core of the completed hide roll, as will be seen. The end of the spindle is then coupled to the air hose 24 and said tube 27 is inflated, causing the same to expand and securely grip the interior surface of said fiber cylinder and ensuring that the latter is rotatable with the spindle. The free end of the film 42 is then pulled over the guide rod 32, trained in an opposite direction about the spindle assemblage, and is taped or otherwise secured to said fiber cylinder.

When the motor 18 is actuated, the spindle assemblage rotates, including the fiber cylinder 43 thereon, and the plastic film 42 is unwound from the spool 38 and wound about said fiber cylinder, the rod 32 functioning merely as a guide member to maintain said plastic film in the proper position relative to the spindle assemblage.

To form the hides 44 on and about the spindle assemblage, as is shown diagrammatically in FIGS. 5 and 6, the workman merely manually inserts the end of a hide (said hides normally being four or five feet long) between the spindle and the film 42 being wound thereon, as illustrated in FIG. 5. The film holds the hide against the rotating fiber cylinder and progressively advances the same therearound, said film completely covering the hide and eliminating the possibility of its falling from the roll. Consequently, as illustrated in FIG. 6, it is possible to mount any number of hides 44 on the spindle and the necessity for confining the roll to ten or twelve hides, as in conventional cylindrical bundles, is not present.

During the reeling operation the slip clutch 40 is designed to operate simultaneously with the spindle driving motor 18, said slip clutch being driven either by its own motor 45, as illustrated, or being drivably connected to said spindle motor. Said slip clutch is adapted to exert an opposite but lesser driving force on the film spool 38, thus maintaining constant tension on the plastic film and eliminating the possibility of said film becoming fouled. As the size of the roll of hides on the spindle becomes larger during the reeling operation, the aforementioned arms 31 and guide rod 32 are raised simultaneously about their pivot points, by means of the pneumatic pistons 34, to ensure that the position of the film relative to the periphery of the roll remains fairly constant. This may be accomplished either by the operator continuously raising said arms through the valve 36, or it is contemplated that it could be performed automatically by a conventional electric controller synchronizing the same with the reeling operation.

When the hides have all been formed on the roll, or the size of the roll is as large as is desired, the operator merely stops the motor, releases the compressed air from the hollow spindle to deflate the tube 27, and detaches the couplings connecting the ends of the spindle to the air hose and motor. A forked lift truck, or other lifting and transporting device, can then be employed to lift the roll from the frame and convey it to its shipping or storage point. When the roll has been raised from the frame, as described, the spindle can be easily manually withdrawn from the fiber cylinder 43 surrounding the same, which cylinder remains in the roll and forms the core thereof, since the deflated tube 27 on the spindle no longer engages the inner surface of said cylinder. The spindle and tube assemblage is then replaced on the machine.

The two principal features of the present machine, of course, are the novel concept of winding a plastic film integrally with the hides to maintain said hides on the roll, and the unique inflatable spindle assemblage which is designed to ensure that the hide roll will rotate with the spindle during the reeling operation, but which permits said hides to be easily and quickly removed from said spindle when the roll is completed. In addition to its principal function, it has been found that the plastic film employed in the present invention also serves as a protective covering between the rolled hides and minimizes the possibility of their being scratched or marred, which is important when finished or semifinished hides are to be stored or transported. Moreover, the presence of the plastic film therebetween prevents the hides from sticking together and facilitates their removal from the roll.

With respect to the removal of the hides from the roll when they are to be used, the machine comprising the present invention can also be advantageously utilized for that operation, it being necessary to merely reinstall the hide roll on the machine, secure the end of the plastic film to the empty spool 38, and reverse the motor drive arrangement. Thus, as the film is unwound from the hide roll and wound on the spool 38 the hides are automatically disengaged from the roll and can be easily manually removed.

From the foregoing detailed description it will be seen that the present invention provides a unique machine for automatically bundling hides and/or skins, or parts thereof, into a compact, cylindrical roll, which operation has heretofore been done manually, and which machine permits the bundling of a greater number of such hides or the like in a single roll than was formerly possible. Moreover, the present machine includes novel integral means for locking the hide roll on and for rotation with the machine spindle during the reeling operation but which permits its quick and easy removal when the roll is completed.

It is to be understood, of course, that various changes and modifications in the unique hide rolling and bundling structure and method illustrated and hereinabove described will undoubtedly occur to those skilled in the art, and all of such changes or modifications are contemplated as come within the spirit of the invention and within the scope of the following claims.

What we claim is:

1. A method of bundling a large number of relatively short lengths of relatively heavy, flat flexible material, comprising: feeding a continuous length of thin, lightweight flexible wrapping material; rolling said fed wrapping material; and inserting the short lengths of flat flexible material one after another between the outer periphery of the roll of wrapping material and the portion of wrapping material being fed while rolling said wrapping material, the insertion being at such a location on the roll that the flexible material is supported on the periphery of the roll while it is being inserted, with the wrapping material thereafter holding it against the roll.

2. A method of rolling flat, relatively heavy material such as hides into a relatively large cylindrical roll comprising the steps of feeding a continuous length of plastic film to a roll while maintaining a portion of the film at an angle to an upper portion of the periphery of the roll, rolling said fed plastic film, and inserting hides one after another between said angled portion of the film and the outer periphery of the roll, while the film is being rolled and while supporting each hide on the periphery of the roll as it is being inserted whereby the film thereafter holds each hide against the roll.

3. A machine for bundling hides or the like in a roll comprising a frame, a spindle on which a roll-bundle is to be wound rotatably supported on said frame, means for driving said spindle, means spaced from said spindle for feeding a continuous web of light-weight wrapping material to said spindle, which means is located above the spindle in such a position that a length of wrapping material being fed to the spindle forms an angle with an upper portion of the periphery of the roll-bundle thereon to provide a receiving mouth in which hides may be inserted one after another whereby each hide is initially supported on an upper portion of the periphery of the roll-bundle with the wrapping material thereafter holding it against the roll-bundle.

4. A machine for bundling items of flat, relatively heavy flexible material in a roll comprising a frame, driven means on said frame for removably and rotatably supporting a core on which a roll-bundle is to be wound, means spaced from said driven means for supporting a supply roll of light-weight wrapping material, means for guiding wrapping material from said supply roll to said core, which guiding means is located in such a position that a length of wrapping material being fed to the core forms an angle with a portion of the periphery of the roll-bundle to thereby provide a receiving mouth in which said items may be inserted one after another and whereby each item is initially supported on a portion of the periphery of the roll-bundle with the wrapping material thereafter holding it against the roll-bundle, and means providing for movement of said guiding means outwardly as the size of the roll-bundle increases to maintain said receiving mouth.

References Cited in the file of this patent
UNITED STATES PATENTS

| | | |
|---|---|---|
| 2,280,573 | Flaws | Apr. 21, 1942 |
| 2,653,429 | Fitzerald | Sept. 29, 1953 |
| 2,915,212 | Wohlman | Dec. 1, 1959 |
| 3,006,277 | Willard | Oct. 31, 1961 |